(12) United States Patent
Shenoy

(10) Patent No.: US 9,413,569 B2
(45) Date of Patent: Aug. 9, 2016

(54) ADAPTIVE DETECTOR THRESHOLD COMPENSATION IN BINARY FRAME BASED COMMUNICATION SYSTEMS

(71) Applicant: NXP B.V., Eindhoven (NL)

(72) Inventor: Shakti Prasad Shenoy, Mangalore (IN)

(73) Assignee: NXP B.V., Eindhoven (NL)

(*) Notice: Subject to any disclaimer, the term of this patent is extended or adjusted under 35 U.S.C. 154(b) by 260 days.

(21) Appl. No.: 13/629,857

(22) Filed: Sep. 28, 2012

(65) Prior Publication Data

US 2014/0092945 A1    Apr. 3, 2014

(51) Int. Cl.
| | | |
|---|---|---|
| H03K 9/00 | (2006.01) | |
| H04L 27/00 | (2006.01) | |
| H04L 25/06 | (2006.01) | |

(52) U.S. Cl.
CPC .................................. H04L 25/062 (2013.01)

(58) Field of Classification Search
CPC .................................................... H04L 25/245
USPC .................. 375/317, 368, 354, 365; 370/514; 455/67.11
See application file for complete search history.

(56) References Cited

U.S. PATENT DOCUMENTS

| | | | | |
|---|---|---|---|---|
| 4,807,258 A | * | 2/1989 | Sieber | ................... H04L 5/1484 375/357 |
| 6,377,633 B1 | | 4/2002 | Schneider | |
| 6,381,309 B1 | * | 4/2002 | Tremblay | ........................ 379/52 |
| 6,785,344 B1 | | 8/2004 | Jiang et al. | |
| 6,839,392 B1 | * | 1/2005 | Bagheri et al. | ................. 375/368 |
| 6,944,560 B2 | * | 9/2005 | Kuo | ................................. 702/69 |
| 2006/0135073 A1 | * | 6/2006 | Kurapati et al. | ........... 455/67.11 |
| 2013/0136155 A1 | * | 5/2013 | Weill | ....................... G01S 19/24 375/142 |

FOREIGN PATENT DOCUMENTS

| | | |
|---|---|---|
| CN | 1588823 A | 3/2005 |
| CN | 101351035 A | 1/2009 |
| CN | 101577580 A | 11/2009 |
| CN | 102012499 A | 4/2011 |

OTHER PUBLICATIONS

Kim et al., "Design of Ook System for Wireless capsule Endoscopy", School of Electrical Engineering and INMC, Seould National University, Seoul, Korea, IEEE, 2010, pp. 1205-1208.

Dulek, et al., "Optimal Signaling and Detector Design for Power Constrained On-Off Keying Systems in Neyman-Pearson Framework", Department of Electrical and Electronics Engineering, Bilken University, Bilkent, Ankara 06800, Turkey, 2011 IEEE, pp. 93-96.

Technical Specification: Universal Mobile Telecommunications System (UMTS); UTRAN Iuant interface: Layer 1 (3GPP TS 25.461 version 9.1.0 Release 9), Jan. 2010, pp. 1-18.

(Continued)

*Primary Examiner* — Sam K Ahn
*Assistant Examiner* — Fabricio R Murillo Garcia

(57) ABSTRACT

Various exemplary embodiments relate to a method of producing adaptive thresholds in a binary frame based communication system, including: collecting Kst samples of a received signal corresponding to a start bit; computing an estimate of as received signal parameter Pst in the start bit; adjusting an start threshold based upon Pst; collecting Ksp samples of the received signal corresponding to a stop bit; computing an estimate of a received signal parameter Psp in the stop bit; and adjusting an stop threshold based upon Psp.

14 Claims, 5 Drawing Sheets

(56) References Cited

OTHER PUBLICATIONS

Maxim Integrated: Determining Clock Accuracy Requirements for UART Communications, Aug. 7, 2003, pp. 1-9, retrieved from the internet: URL:http://pdfserv.maximintegrated.com/en/an/AN2141.pdf, retrieved on Aug. 11, 2015, p. 2, paragraph 2, figures 1, 2.

EPO Communication and Extended European Search Report dated Aug. 21, 2015, for Application No. 13182999.6-1860.
EPO Communication and Partial Extended European Search Report dated Nov. 4, 2015, for Application No. 13182999.6-1860.
China Office Action, counterpart application 201310435862.2 (May 31, 2016).

* cited by examiner

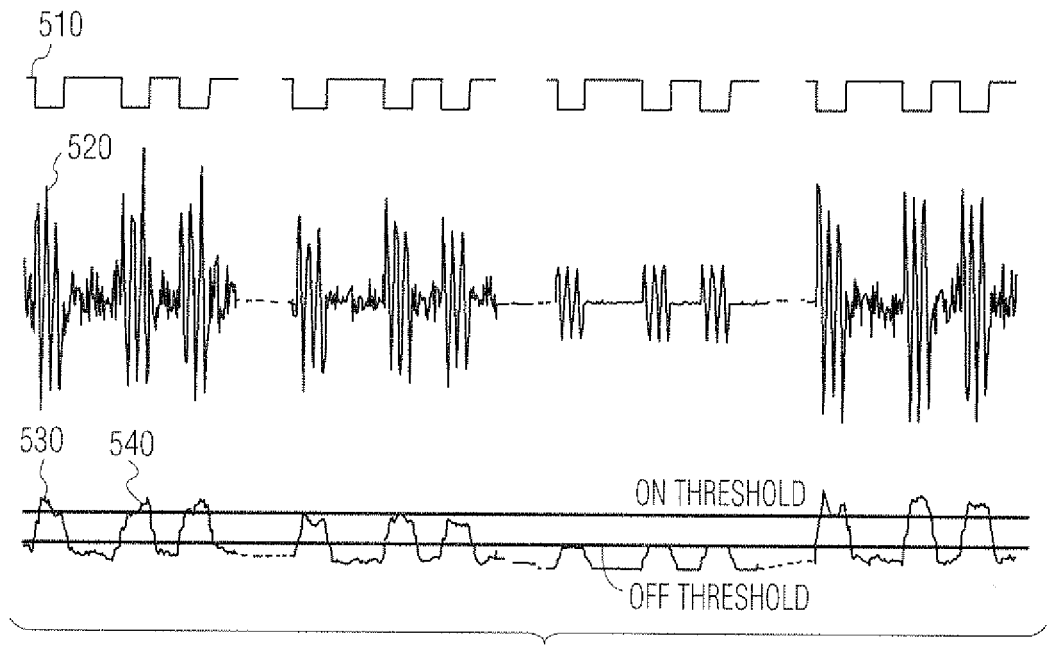
FIG. 5
FIG. 6
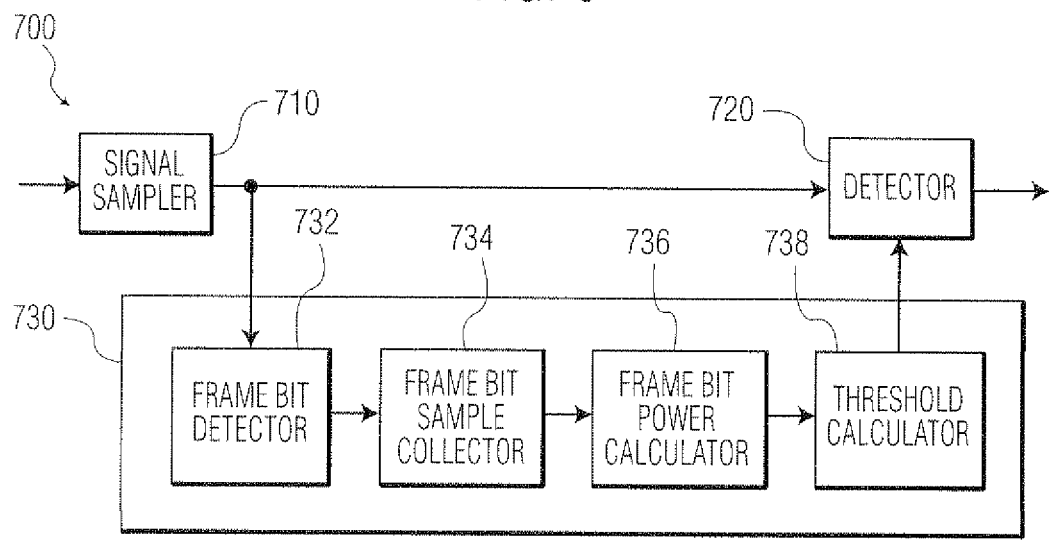
FIG. 7

ADAPTIVE DETECTOR THRESHOLD COMPENSATION IN BINARY FRAME BASED COMMUNICATION SYSTEMS

TECHNICAL FIELD

Various exemplary embodiments disclosed herein relate generally to adaptive detector threshold compensation in binary frame based communication systems.

BACKGROUND

In any communication system where modulated data is transmitted over a non-ideal channel, the receiver has to account for channel impairments while demodulating the received signal. In the particular case of a binary data communication system, the efficiency of the demodulation rests on the ability of the receiver to differentiate between the transmission of a binary "0" or a binary "1" in the received signal. Determining the operating characteristics of the data channel at any given time will allow the receiver to compensate for channel impairments. For binary data communication, the receiver may use two thresholds to determine when a binary "0" or a binary "1" is detected in the received signal. In channels that vary slowly over time, these thresholds may be adapted over time to compensate for changes in the channel. Typically the data channel may be characterized by transmitting a pilot or other signal used to determine the characteristics of the channel. This has the disadvantage of reduced data throughput because of the increased overhead and increased system complexity.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a method of producing adaptive thresholds in a binary frame based communication system, including: collecting Kst samples of a received signal corresponding to a start bit; computing an estimate of one or more received signal parameters Pst corresponding to the start bit; adjusting a threshold based upon Pst; collecting Ksp samples of the received signal corresponding to a stop bit; computing an estimate of one or more received signal parameters Psp corresponding to the stop bit; and adjusting a threshold based upon Psp.

Various exemplary embodiments relate to a threshold compensator, comprising: a frame bit detector; a frame bit collector; a frame bit parameter calculation device; and a frame bit threshold calculation device.

BRIEF DESCRIPTION OF THE DRAWINGS

In order to better understand various exemplary embodiments, reference is made to the accompanying drawings, wherein:

FIG. 5 illustrates detection thresholds and the effects when the detection thresholds are uncompensated;

FIG. 6 illustrates an example of a data frame;

FIG. 7 illustrates a block diagram of a receiver in a communication system including an adaptive threshold compensator;

To facilitate understanding, identical reference numerals have been used to designate elements having substantially the same or similar structure and/or substantially the same or similar function.

DETAILED DESCRIPTION

Various types of modulation may be used to modulate digital data onto a carrier signal. An embodiment is described below using On Off Keying (OOK) modulation which is but one particular embodiment of this invention. However, other types of modulation may be used with embodiments of the adaptive threshold compensator, for example any communication system that modulates a carrier's amplitude, phase, frequency or a combination of these in order to transmit a binary "0" or a "1".

Figure 1A:
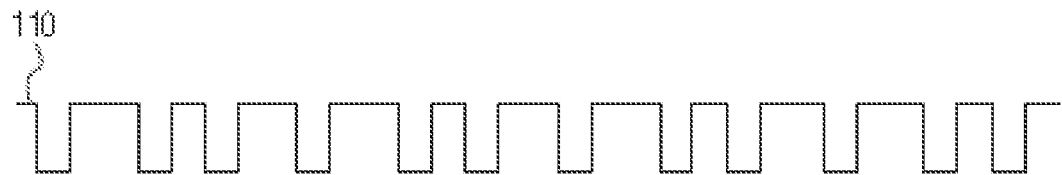
FIGS. 1A and 1B illustrate binary data and carrier signal OOK modulated by binary data.
Figure 1B:
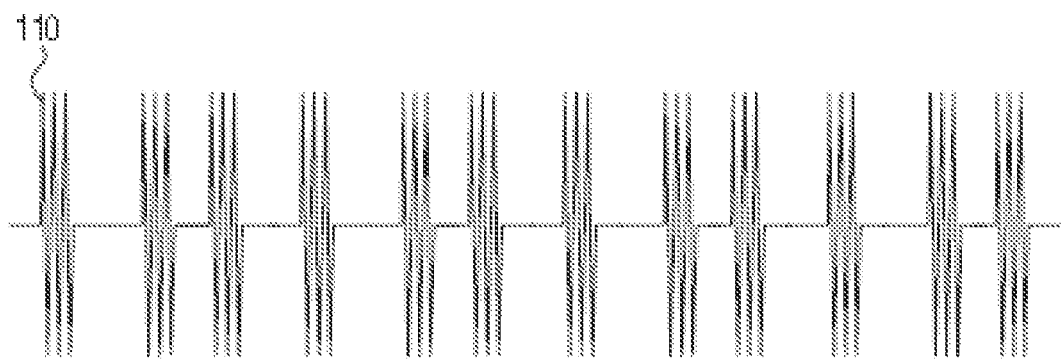

OOK is a special case of Amplitude Shift Keying (ASK) where the amplitude of the carrier frequency is modulated in order to transmit binary data over the carrier. FIGS. 1A and 1B illustrate binary data and carrier signal OOK modulated by the binary data. FIG. 1A illustrates an example 110 of an OOK transmission when a bit sequence 0110101101101011011010 is modulated on a carrier waveform using OOK modulation. In OOK, a binary "1" may be indicated by switching off the carrier (Carrier OFF) and a binary "0" is indicated by switching on the carrier (Carrier ON) during their respective bit periods. Therefore as shown in FIG. 1B when a "0" is to be transmitted, the carrier is on and when a "1" is to be transmitted, the carrier is off 120.

As discussed above, in other embodiments the frequency or the phase of the carrier may also be modulated. For example, Binary Phase Shift Keying (BPSK) modulation changes the phase of the carrier (instead of the amplitude) to encode a binary "0" or "1", and Binary Frequency Shift Keying (BFSK) uses carriers of different frequencies during the bit period corresponding to "0" and "1" to encode the binary data for transmission.

Because data is often sent in discrete packets in a packet based digital communication system, the continuous stream of data (like the string "0110101101101011011010" shown above 110) may often be parsed into data frames for transmission. As a result the communication system may more easily detect and correct errors in the packets, for example, with a cyclic redundancy check (CRC) bit. Such discrete data packets may be called frames.

Figure 2:
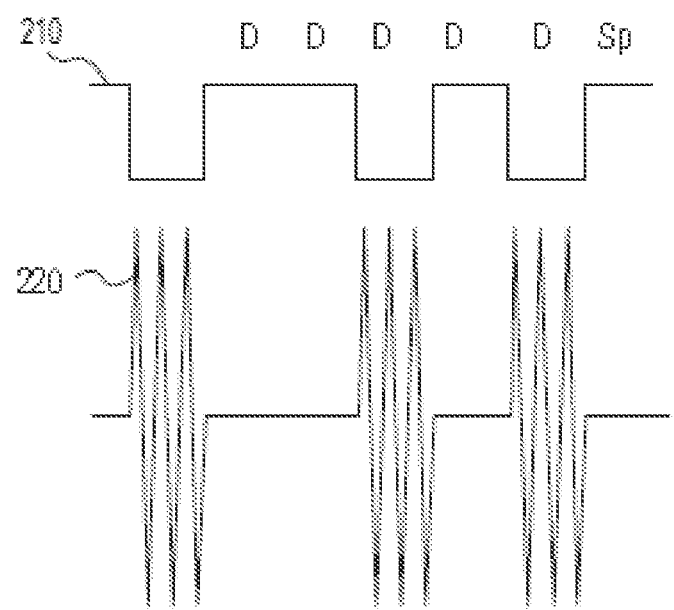
FIG. 2 illustrates an OOK modulated 7 bit frame.

FIG. 2 illustrates an OOK modulated 7 bit frame. Each frame 210 may contain three different types of bits: the start bit (which is denoted by St) that may indicate the start of the frame; the data bits (which are denoted by D) that may contain the actual data (payload); and the stop bit (which is denoted by Sp) that may indicate the end of the frame. Note that the start bit may be denoted by a binary "0" and a stop bit by a binary "1" in this example, but the reverse may be true as well. The use of "0" as the start bit and "1" as the stop bit is the generally accepted convention in frame based systems like the UART protocol.

Such an OOK modulated data frame 220 may be transmitted on a channel over a transmission medium (for example, cable or wireless) and may be received at a receiver. The channel may have its own amplitude, phase and frequency response, and therefore, the received signal's characteristics may be distorted by the channel response. In addition, the channel and the receiver front end may add noise to the received signal. It is this distorted and noisy signal that the receiver may be required to demodulate in order to retrieve the binary data.

The channel that may have its own typical amplitude, phase and frequency response which may be called the channel response. The channel response causes the transmitted signal's amplitude, phase, frequency or a combination of these to be distorted as the signal passes through the channel. In addition, both the channel and receiver front end may add noise to the received signal. Moreover, the channel response and the power of noise may vary over time, especially when the transmission media is exposed to an environment that may change over time. This may lead to a time varying channel response and time varying noise contribution to the received signal. A robust receiver design may incorporate some means to compensate for this time varying channel response and noise.

Figure 3:
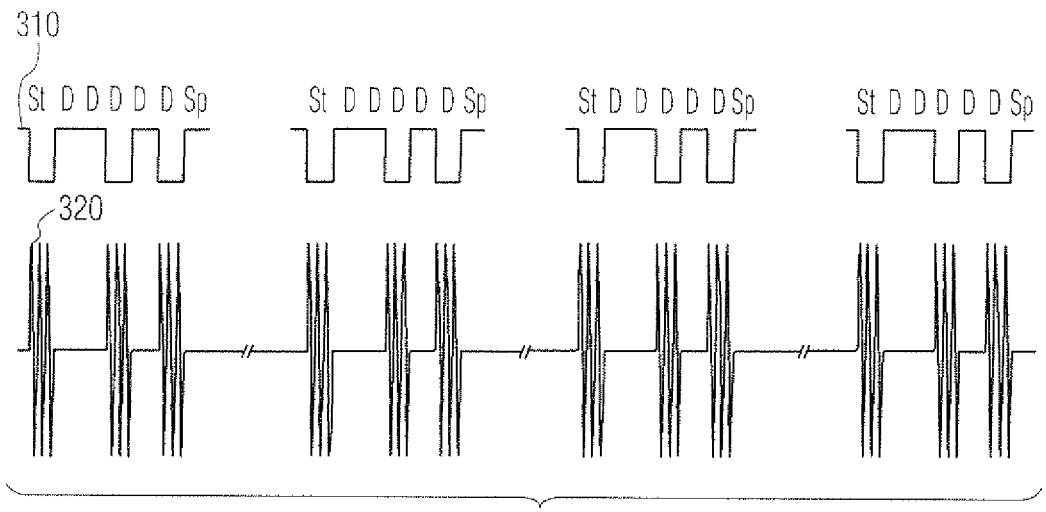
FIG. 3 illustrates a number of OOK modulated 7 bit frames.

FIG. 3 illustrates a number of OOK modulated 7 bit frames. FIG. 3 depicts the transmitted carrier waveform 320 corresponding to 4 binary data frames 310 sent at different instants of time. For simplicity, the same data frame is depicted in the following figures as well. The line break in the plots indicate that time has passed between the transmission of these frames.

Figure 4:
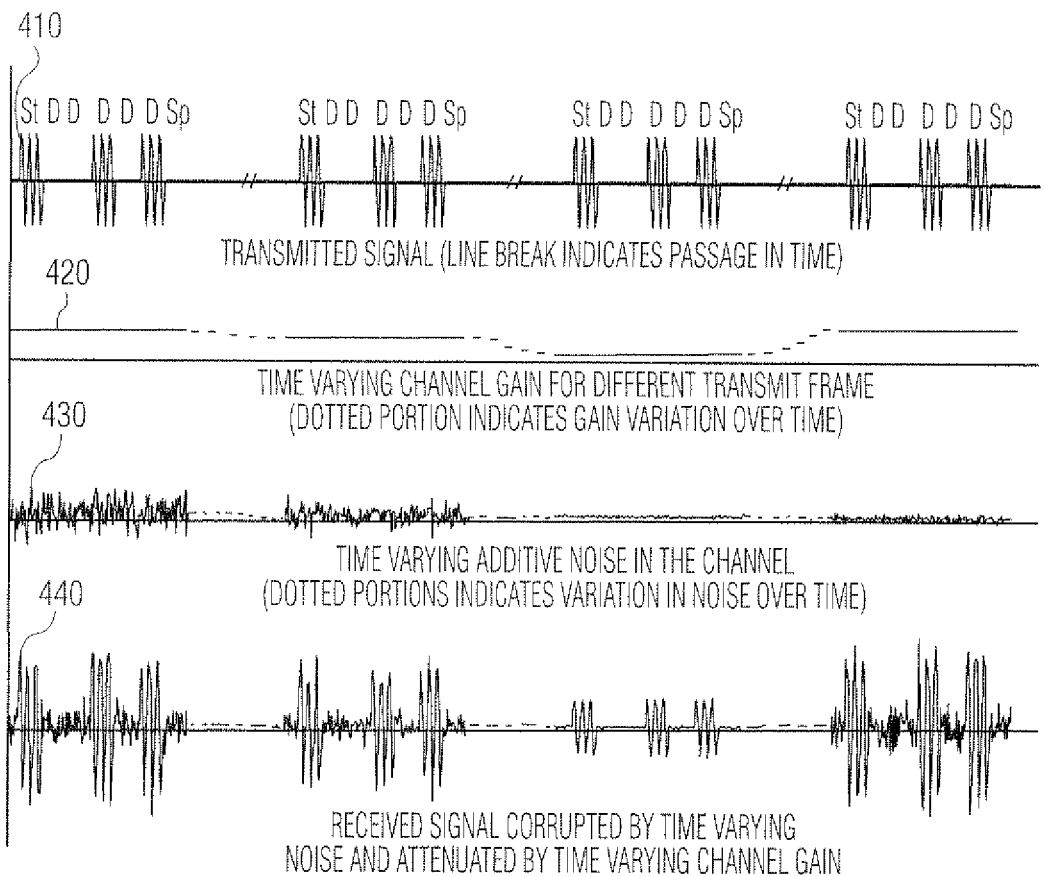
FIG. 4 illustrates a transmitted OOK modulated signal, a time varying channel gain, a time varying additive noise in the channel, and a received signal including the effects of channel gain and additive noise.

FIG. 4 illustrates a transmitted OOK modulated signal 410, a time varying channel gain 420, a time varying additive noise in the channel 430, and a received signal including the effects of channel gain and additive noise 440. Further, FIG. 4 depicts the effect of the time varying channel gain and additive noise on the transmitted signal. The transmitted waveform 410 is show at 4 different instances and the varying channel gain 420 is shown at those same instants. The time varying noise 430 is shown that may be added to the signal at these same instances, and finally the signal 440 is shown that may be received at the receiver. As illustrated, the received signal may be corrupted by noise, and the received signal's amplitude also may vary due to the varying channel amplitude response.

Typically, in OOK, the detector in the receiver may decide if a "0" or a "1" is transmitted based on an ON threshold and OFF threshold that may be pre-computed at the receiver. Accordingly, when one or more signal parameters (for example, its power) are above (or below) the ON threshold then the receiver may decide that a binary "0" was transmitted, and when one or more signal parameters (for example, its power) are below (or above) the OFF threshold, then the receiver may decide that a binary "1" was transmitted. Other signal parameters may include phase, frequency, amplitude, etc. or any combination of these.

When the channel has a time varying response and when time varying noise is added to the received signal, in order to mitigate the effect of the time varying channel response and noise, either the receiver may employ some decision directed methods to change the threshold values or may periodically estimate the channel to compute the channel response that is applicable at that time. In both of these approaches, the receiver may adapt the thresholds used to detect the binary data to compensate for the changes in the channel gain and noise. However, previous methods to adapt receiver thresholds are significantly complex and may suffer from error propagation issues. Accordingly, the adaptive threshold compensator and method described below provide for a less complex implementation and do not suffer from error propagation issues.

FIG. 5 illustrates detection thresholds and the effects when the detection thresholds are uncompensated. In the third plot 530 in FIG. 5, the ON Threshold, the upper line, and the OFF threshold, the lower line, are shown as constant. The transmitted bit pattern 510 is shown in the first plot, and the received signal 520 is shown in the second plot. The envelope of the received signal 540 is shown at the input of the detector in the receiver. Because there is no threshold compensation, one entire frame (the 3rd frame) may be decoded erroneously as 0s. In addition, another frame (the 2nd frame) may be incorrectly decoded in most places.

In an embodiment described below, knowledge of the frame structure at the receiver may be used to adaptively compute the ON and OFF thresholds based on the start and stop bit. This may allow the frames to be correctly decoded despite the time varying channel response.

In a general frame based data communication system, the transmit data frame may start with a start-symbol and may end with a stop-symbol that may be defined in the communication protocol. In the case of a binary frame based communication protocol (e.g., a UART protocol) the start-symbol may be a binary "0" and the stop-symbol is a binary "1". Note that the start and the stop symbols may be reversed without affecting the working of this embodiment. When the transmit data rate is known at the receiver, the receiver may precisely know when the start and stop bits begin. This knowledge of the frame structure may be used to compute a reliable estimate of the power of the received signal during the transmission of a binary "1" and a binary "0". This may allow the receiver to accurately compute the ON and OFF thresholds that are used by the detector. By continuously/periodically computing these estimates, the receiver may track the channel and noise variations without any additional data (for example pilots).

An embodiment of an adaptive threshold compensator and method will now be described. Binary data may be transmitted using an OOK carrier waveform. Further, the receiver knows the rate at which data is received (i.e., the receive data rate). In the following description, the start bit is a binary "0", and a stop bit is a binary "1". However, the start and stop bit can respectively be binary "1" and a "0" without affecting the operation of this embodiment.

FIG. 6 illustrates an example of a data frame. In FIG. 6 the received signal has a 7 bit frame structure. FIG. 6 also illustrates a time line below the frame structure to demarcate the start of the start bit period of the frame with Tst and the start of the stop bit period with Tsp.

FIG. 7 illustrates a block diagram of a receiver in a communication system including an adaptive threshold compensator. The receiver 700 may include a signal sampler 710, a detector 720, and a threshold compensator 730. The signal sampler 710 receives the data signal and produces data samples. The sampling rate of the of the signal sampler 710 typically may be a multiple K of the bit rate, so that K samples may be collected for each bit. It may be preferable for K to be at least 4 or 5 in order to receive enough samples per bit in order to estimate one or more signal parameters corresponding to the sampled bit. Other values of K may he used as well. A larger K provides more samples for a more accurate estimate of the parameters, but at the expense of increased sampling at the receiver. A smaller K decreases the sampling requirement, but may lead to a less accurate estimate of the estimated parameters. Accordingly K may be selected in order to balance these and other constraints on the receiver 700. Signal parameters may include power, phase, frequency, amplitude, etc. or any combination of these.

The detector 720 may receive the data samples from the signal sampler 710. The detector 720 applies the two thresholds, the ON threshold and the OFF threshold, to the data samples to determine if a "1" bit or a "0" bit is present. The detector 720 may require a certain number of samples within a window of samples to satisfy one of the thresholds before making a decision as to the presence of a "1" or "0" bit. Further, the detector may also receive alignment information indicating at which sample a bit begins.

The threshold compensator 730 may further include a frame bit detector 732, a frame bit sample collector 734, a frame bit parameter estimator 736, and a threshold calculator 738. The frame bit detector 732 receives the data samples from the signal sampler 710. The frame bit detector 732 determines when a frame bit is present. When a frame bit is present, the frame bit detector 732 may send the data samples for the frame bit to the frame bit collector 734. The frame bit may detect either a start bit or a stop bit and may further indicate to the frame bit collector 734 whether the data samples correspond to a start or stop bit.

The frame bit collector 734 may collect the frame bit samples from the frame bit detector. The samples for start and stop bits are collected separately. Further, the frame bit collector 734 may collect data samples for single start and stop bits or may collect samples for a number of start and stop bits. The number of frame bits that the data samples are collected over may be selected based upon memory constraints and the channel and noise variation over time. The faster the variations, the shorter the window, and the slower the variations, the longer the window. Further, the samples may be analyzed to determine how quickly the channel characteristics may be varying and the window for the frame bit samples may be adjusted accordingly.

The frame bit parameter estimator 736 uses the collected data samples for a frame bit to estimate one or more parameters of the received frame bit signal. Signal parameters may include power, phase, frequency, amplitude, etc. or any combination of these. The frame bit parameter estimator 736 then may send the estimated parameters for the frame bit to the threshold calculator 738 and may further indicate to the frame bit threshold calculator 738 whether the data samples correspond to a start or stop bit. The threshold calculator 738 may receive the estimated power for the frame bit and may calculate an updated threshold that the threshold calculator 738 may send to the detector 720. The calculation of the threshold may be done using any known method and may be based upon the characteristics of the modulation, the channel, the noise, the receiver, etc.

The threshold compensator 730 may be implemented in circuitry such as an integrated circuit (IC). The threshold compensator 730 may also be implemented as part of a receiver circuit which may be an IC. Further, the threshold compensator 730 may be implemented as program instructions implemented on a processor. As used herein, the term processor will be understood to encompass a variety of devices such as microprocessors, field-programmable gate arrays (FPGAs), application-specific integrated circuits (ASICs), and other similar processing devices.

Figure 8:
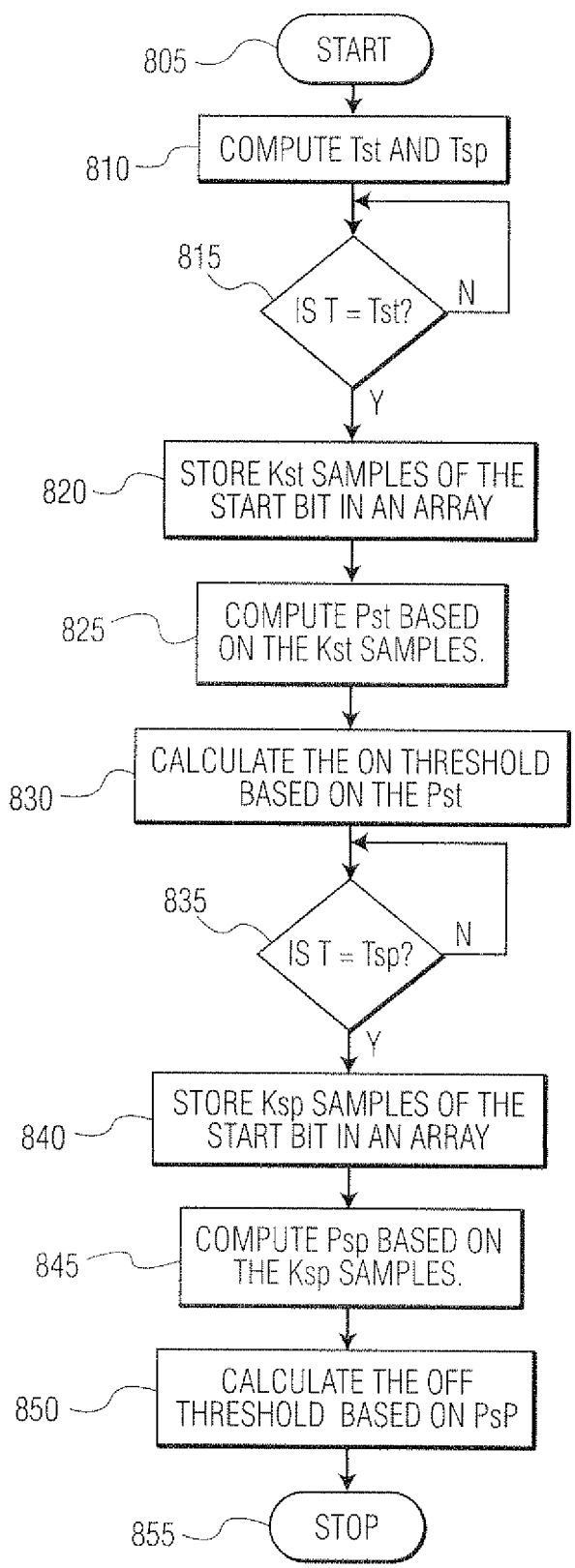
FIG. 8 illustrates a flow diagram of an adaptive threshold compensator.

FIG. 8 illustrates a flow diagram of an adaptive threshold compensator. The method 800 may be performed by the threshold compensator 730 and/or the receiver 700. The method 800 begins at step 805. First, the method 800 may compute the start bit start time Tst and the end bit start time Tsp 810. Because the threshold compensator 730 has knowledge of the data rate and the frame structure of the data in the signal, the threshold compensator 730 may compute the start time of the start and the stop bit. These values Tst and Tsp may be stored for later use.

Next, the threshold compensator 730 then may wait for the start of the start bit period by determining if the current time equals or exceeds the start bit time Tst 815. If not, the method 800 loops back to perform step 815 again. If so, the threshold compensator then may collect Kst number of received signal samples corresponding to the start bit (at the rate of the sampling frequency) and may store it in a data array 820. The stored start bit data may be for a single start bit or may include data for a number of start bits as discussed above.

Then the threshold compensator 730 may compute an estimate of one or more parameters Pst of the signal corresponding to the start bit using parameter estimation algorithms on this array of Kst samples 825. An example of such an algorithm may include estimating the power of the signal as the mean value of the squares of the amplitude values in this array. Next, the threshold compensator 730 may calculate the ON threshold based upon Pst 830. This ON threshold may be sent to the detector 720.

The threshold compensator 730 then may wait for an appropriate amount of time (the bit period times the number of data bits in the frame) until the time Tsp is reached 835. At this point, the threshold compensator 730 then may collect Ksp number of received signal samples corresponding to the stop bit (at the rate of the sampling frequency) and may store it in a data array 840. The stored stop bit data may be for a single stop bit or may include data for a number of stop bits as discussed above.

Then the threshold compensator 730 may compute an estimate of one or more parameters Psp corresponding to the signal in the stop bit using parameter estimation algorithms on this array of Ksp samples 845. An example of such an algorithm may include estimating the power of the signal as the mean value of the squares of the amplitude values in this array. Next, the threshold compensator 730 may calculate the OFF threshold based upon Psp 850. This OFF threshold may be sent to the detector 720. The method 800 my then stop at 855. While the above method described above is for a single pass of the method, the method may be repeated to repeatedly calculate the detection thresholds based upon current channel and noise characteristics.

Figure 9:
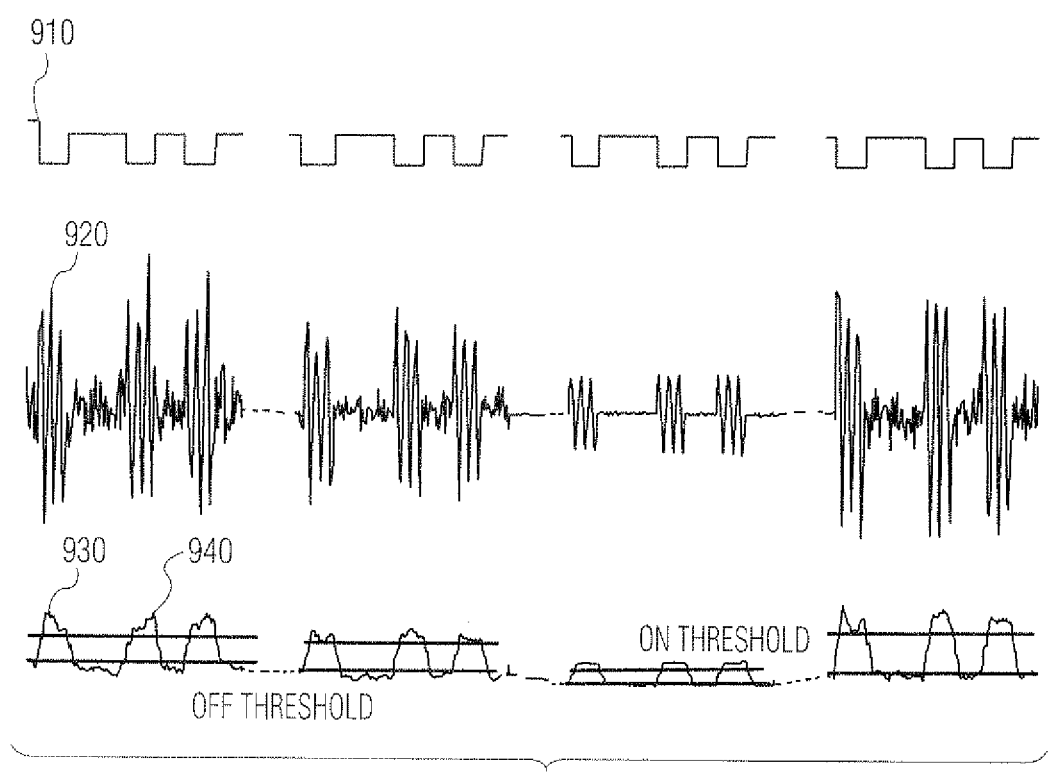
FIG. 9 illustrates the result of using an adaptive threshold compensation method illustrated in FIG. 8.

FIG. 9 illustrates the result of using an adaptive threshold compensation method illustrated in FIG. 8. The first and second plots 910, 920 in FIG. 9 are the same as those for FIG. 5. Further, the third plot 930 shows the same envelope 940 of the received signal as the signal envelope 540 in FIG. 5, but in FIG. 9, the threshold values vary as shown. Previously as shown in FIG. 5, there were data detection errors in the second and third frames, but with the illustrated adaptive thresholds, the second and third frames may be properly detected.

FIG. 9 shows the change in threshold values due to a threshold compensator 730 that uses the method shown in FIG. 8. In FIG. 9, the ON threshold (the upper threshold) and OFF threshold (the lower threshold) now vary in time along with the channel gain and noise scenario. These thresholds may be calculated continuously or periodically based on the implementation and therefore may be able to track the variations in noise and channel gain. This may lead to a very robust detector 720 and receiver 700 that now may be capable of decoding signals properly.

This above described threshold detector and method may be applied in systems that use binary communications with a standard frame structure. For example, in addition to OOK modulated waveforms, it may be used to adaptively compensate phase thresholds for BPSK modulated waveforms, frequency thresholds for BFSK modulated waveforms, or any combination of phase, frequency and amplitude values that are used to represent binary 0/I in a communication system. Further, the threshold compensator and method described above may be using in various applications and systems, including the following examples: machine to machine communication systems; wired, serial communication systems; in-vehicle powerline communications; network-on-chip applications where information may be transferred between different systems on the chip through power lines; OOK transmitter for wireless capsule endoscope and such kind of applications; etc.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of producing adaptive thresholds in a binary frame based communication system, comprising:
    collecting, with a frame bit sample collector, Kst samples of a received signal corresponding to a start bit at a start of a frame;
    computing, with a frame bit parameter estimation device, an estimate of a received signal parameter Pst of the start bit;
    adjusting, with a frame bit threshold calculation device, a start threshold based upon the Pst;
    collecting, with the frame bit sample collector, Ksp samples of the received signal corresponding to a stop bit at an end of a frame, wherein the Kst and Ksp samples are collected separately;
    computing, with the frame bit parameter estimation device, an estimate of a received signal parameter Psp of the stop bit; and
    adjusting, with the frame bit threshold calculation device, a stop threshold based upon the Psp wherein the first and second thresholds are applied to the received signal.

2. The method of claim 1, further comprising:
    determining a start time Tst of a start bit of the received signal and
    determining a start time Tsp of a stop bit of the received signal.

3. The method of claim 1, wherein the received signal is one of an On Off Keying (OOK), a Binary Phase Shift Keying, and a Binary Frequency Shift Keying modulated signal.

4. The method of claim 1, further comprising:
    detecting a binary bit.

5. The method of claim 1, further comprising:
    repeating the steps of:
        collecting, with the frame bit sample collector, the Kst samples of the received signal corresponding to the start bit;
        computing, with the frame bit parameter estimation device, the estimate of the received signal parameter Pst in the start bit;
        adjusting, with the frame bit threshold calculation device, the start threshold based upon the Pst;
        collecting, with the frame bit sample collector, the Ksp samples of the received signal corresponding to the stop bit;
        computing, with the frame bit parameter estimation device, the estimate of the received signal parameter Psp in the stop bit; and
        adjusting, with the frame bit threshold calculation device, the stop threshold based upon the Psp.

6. The method of claim 5, wherein the collecting of the Kst samples includes collecting samples of the received signal for a plurality of start bits and wherein the collecting of the Ksp samples includes collecting samples of the received signal for a plurality of stop bits.

7. A non-transitory program storage device readable by a machine, tangibly embodying a program of instructions executable by the machine to perform the method of claim 1.

8. A threshold compensator, comprising:
    a frame bit detector configured to detect a frame start bit and a frame stop bit of a received signal;
    a frame bit sample collector configured to separately collect samples of the frame start bit and the frame stop bit;
    a frame bit parameter estimation device configured to calculate a frame start bit signal parameter based upon the collected samples of the frame start bit and a frame stop bit signal parameter based upon the collected samples of the frame stop bit;
    a frame bit threshold calculation device, wherein the frame bit threshold calculation device is configured to calculate a first threshold based upon the calculated frame start bit signal parameter and a second threshold based upon the calculated frame stop bit signal parameter, wherein the first and second thresholds are applied to the received signal.

9. The threshold compensator of claim 8, wherein the frame bit sample collector is configured to collect samples of both the frame start bit and the frame stop bit over a plurality of frames.

10. The threshold compensator of claim 9, wherein the frame bit parameter estimation device is configured to calculate frame start bit power and frame stop bit power.

11. The threshold compensator of claim 10, wherein the frame bit threshold calculation device is configured to calculate the first threshold based upon the calculated frame start bit power and the second threshold based upon the calculated frame stop bit power.

12. The threshold compensator of claim 8, wherein the threshold detector is configured to receive a signal that is one of an On Off Keying (OOK), a Binary Phase Shift Keying, and a Binary Frequency Shift Keying modulated signal.

13. A receiver comprising the threshold compensator of claim 8.

14. A system comprising the threshold compensator of claim 8, wherein the system is one of a machine to machine communication system, a wired, serial communication system, an in-vehicle communication system, a network-on-chip wherein information may be transferred between different systems on the network-on-chip through power lines, and a receiver configured to receive signals from a medical device.

* * * * *